United States Patent [19]

Sedin

[11] 3,839,677

[45] Oct. 1, 1974

[54] TUNABLE RESONANT CIRCUITS EMPLOYING FERRIMAGNETIC BODIES CONTROLLED BY COMMON (MAIN) AND NONCOMMON (AUXILIARY) MAGNETIC FIELDS

[75] Inventor: James W. Sedin, Mountain View, Calif.

[73] Assignee: Varian Associates, Palo Alto, Calif.

[22] Filed: Oct. 9, 1973

[21] Appl. No.: 404,586

Related U.S. Application Data

[63] Continuation of Ser. No. 236,895, March 22, 1972, abandoned.

[52] U.S. Cl. .................. 325/446, 325/439, 325/453, 329/116, 333/76, 333/82 R

[51] Int. Cl. .............................................. H04b 1/26

[58] Field of Search .................... 325/446, 439, 453; 329/116; 333/24.2, 73, 11, 10, 82 R, 76; 331/96

[56] References Cited

UNITED STATES PATENTS

| | | | |
|---|---|---|---|
| 2,907,876 | 10/1959 | Vaniz | 325/439 |
| 2,923,815 | 2/1960 | Sontheimer | 325/453 |
| 3,274,519 | 9/1961 | Nathanson | 329/116 |
| 3,290,625 | 12/1966 | Bartram et al. | 333/24.2 |
| 3,569,972 | 3/1971 | McEvoy | 333/73 |
| 3,576,503 | 4/1971 | Hanson | 333/82 R |
| 3,622,896 | 11/1971 | Pircher | 329/116 |

*Primary Examiner*—Albert J. Mayer
*Attorney, Agent, or Firm*—Stanley Z. Cole; D. R. Pressman; Robert K. Stoddard

[57] ABSTRACT

First and second ferrimagnetic resonator tuned circuits, such as a input filter circuit and local oscillator circuit, have their respective ferrimagnetic resonator bodies disposed in the gap of an common magnet. An auxiliary magnet is provided for producing an offset in the magnetic field intensity within one of the ferrimagnetic resonator bodies relative to the other to produce a difference in the resonant frequencies of the two ferrimagnetic resonator tuned circuits. The magnetic field of the main magnet and, in some cases, the field of the auxiliary magnet as well, are swept in intensity to produce a corresponding sweep in the resonant frequencies of the two ferrimagnetic resonator tuned circuits while maintaining a controlled frequency difference therebetween.

7 Claims, 13 Drawing Figures

TUNABLE RESONANT CIRCUITS EMPLOYING FERRIMAGNETIC BODIES CONTROLLED BY COMMON (MAIN) AND NONCOMMON (AUXILIARY) MAGNETIC FIELDS

This is a continuation of application Ser. No. 236,895 filed Mar. 22, 1972 now abandoned.

DESCRIPTION OF THE PRIOR ART

Heretofore, pre and post ferrimagnetic resonator tuned filter circuits have been provided ahead of and behind an amplifier. The ferrimagnetic resonator bodies of the pre and post filter circuits were disposed in the gap of a common magnet. The magnetic field intensity was swept to produce a corresponding sweep of the pre and post bandpass filter characteristics.

It is also known from the prior superheterodyne receiver art to provide a ferrimagnetic resonator tuned prefilter circuit and a ferrimagnetic local oscillator circuit tuned to a frequency offset from the prefilter passband by the intermediate frequency of the receiver. However, the ferrimagnetic bodies for the filter and local oscillator were disposed in separate magnet structures.

The problem with this prior device is that it was difficult to control the temperature and other magnetic field influence on the two separate magnets, in order that a constant intermediate frequency could be retained, while the first and second magnets were swept in intensity for sweeping the bandpass of the superheterodyne receiver. For example, in one superheterodyne receiver where the input frequency was 10,000MHz and, the intermediate frequency was 160MHz and this had to be held within plus or minus 1MHz while the input passband frequency of the filter and local oscillator were tuned over a relative large band. This required that the two separate fields of the first and second magnets be held constant to one part in $10^4$. The result was that an extremely complex set of current regulators were required for regulating the energizing current of the two magnets to compensate for changes in the temperature of the magnets, and temperatures of the current regulator circuits.

SUMMARY OF THE PRESENT INVENTION

The principal object of the present invention is the provision of an improved tunable ferrimagnetic resonant circuit.

In one feature of the present invention, the ferrimagnetic resonators for controlling the resonant frequency of first and second tuned circuits are located in the magnetic gap of a common magnet and an auxiliary magnet is provided for generating an offset in the magnetic field intensity within one of the ferrimagnetic resonators relative to the other to shift the resonant frequency of one of said ferrimagnetic resonator tuned circuits relative to the other, whereby the magnetic field of a main magnet may be changed to sweep the two offset frequencies in concert while maintaining a constant difference frequency therebetween.

In another feature of the present invention, the means for producing the offset in the magnetic field intensity in one ferrimagnetic resonator relative to the other includes an auxiliary electromagnet for superimposing an offset magnetic field component on one of the ferrimagnetic resonator bodies relative to the other.

In another feature of the present invention, one of the poles of the main magnet is segmented into first and second segments and a coil is wound around one of the pole segments to produce the auxiliary magnet for producing an offset in the magnetic field applied to one of the ferrimagnetic resonators relative to the other.

In another feature of the present invention, first and second sweep current generators are provided for energizing the main magnet and an auxiliary magnet for producing the magnetic field differential, whereby differences in the tuning rates of the first and second ferrimagnetic resonator bodies are compensated by employing different current sweep rates for said first and second sweep current generators.

In another feature of the present invention, a superheterodyne receiver employs a first ferrimagnetic resonator body for determining the passband frequency of the input filter and a second ferrimagnetic resonator body, which is disposed in the gap of the same magnet as used for the first resonator but at an offset intensity, serves as the frequency determining element of the local oscillator, whereby a constant intermediate frequency, as determined by the magnetic field differential, is obtained.

Other features and advantages of the present invention will become apparent upon a perusal of the following specification taken in connection with the accompanying drawings wherein:

DESCRIPTION OF THE PREFERRED EMBODIMENTS

Figure 1:
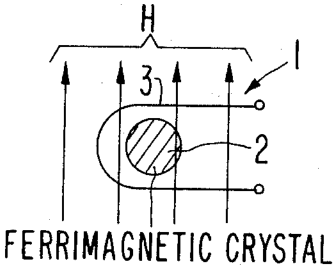
FIG. 1 is a schematic line diagram of a ferrimagnetic resonator.
Figure 2:
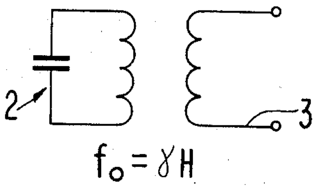
FIG. 2 is the equivalent circuit for the ferrimagnetic resonator of FIG. 1.

Referring now to FIG. 1, there is shown a ferrimagnetic resonant circuit 1. The ferrimagnetic resonant circuit includes a ferrimagnetic crystal resonator body 2, such as a yttrium iron garnet, lithium-ferrite crystal or a gallium yttrium iron garnet. An electrically conductive loop 3 is disposed at least partially encircling the ferrimagnetic crystal 2. The crystal is disposed in a polarizing magnetic field of intensity H. The ferrimagnetic crystal has a resonant frequency $f_0=\gamma H$ where $\gamma$ is the gyromagnetic ratio for electrons and $H$ is the intensity of the polarizing magnetic field. The equivalent circuit for the ferrimagnetic resonant circuit of FIG. 1 is shown in FIG. 2 and includes a resonant circuit corresponding to resonance of the ferrimagnetic crystal 2 which is inductively coupled to the coupling loop 3.

Figure 3:
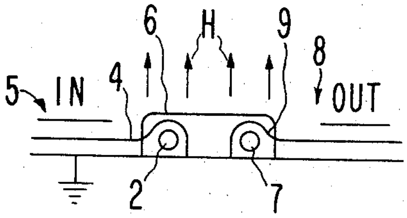
FIG. 3 is a schematic line diagram of a ferrimagnetic filter.

Referring now to FIG. 3 there is shown a filter incorporating two ferrimagnetic crystals. More particularly, the center conductor 4 of an input coaxial line 5 is inductively coupled to the first ferrimagnetic resonator 2. A second conductor 6 is connected at one end to ground and loops over the first crystal 2 to obtain magnetic coupling thereto. The second conductor also loops over a second ferrimagnetic crystal 7 to ground. An output coaxial line 8 has its center conductor 9 inductively coupled to the second ferrimagnetic resonator 7 with the output center conductor 9 being connected at its end to ground.

Figure 4:
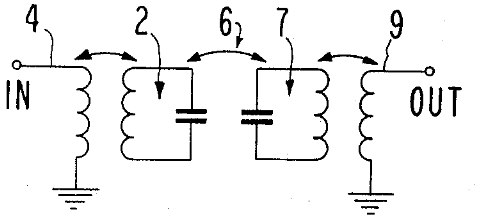
FIG. 4 is the equivalent circuit for the ferrimagnetic filter of FIG. 3.

Input radio frequency energy to be filtered is received in the input coaxial line 5 and excites the ferrimagnetic crystal 2. Radio frequency energy within the passband of the ferrimagnetic resonator 2 is coupled by the second conductor 6 to excite the second ferrimagnetic resonator 7. Output radio frequency energy is coupled from the second ferrimagnetic resonator to the output coaxial line 8. The equivalent circuit for the filter of FIG. 3 is shown in FIG. 4.

Figure 5:
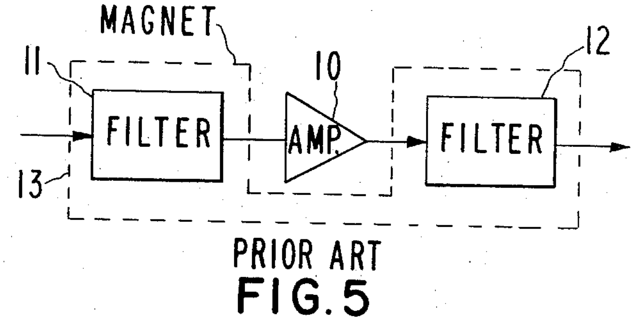
FIG. 5 is a schematic block diagram of an amplifier employing pre and post ferrimagnetic filters.
Figures 6, 7, 8, 9:
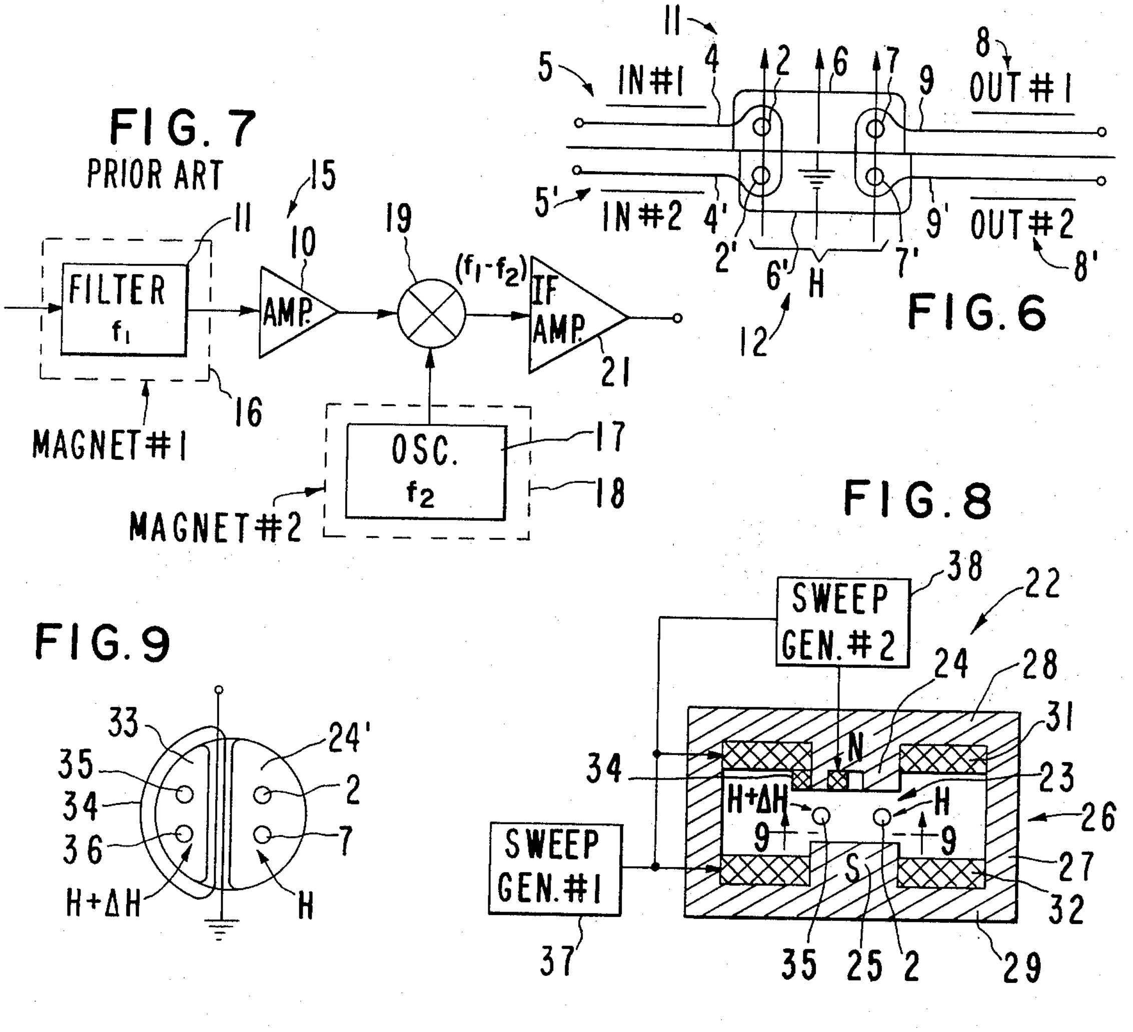
FIG. 6 is a schematic line diagram for the two filters of FIG. 5.
FIG. 7 is a schematic block diagram for a superheterodyne receiver utilizing a ferrimagnetic pre filter and ferrimagnetic local oscillator.
FIG. 8 is a schematic diagram, partly in block diagram form, of the ferrimagnetic pre filter and local oscillator incorporating features of the present invention.
FIG. 9 is a sectional view of a portion of the structure of FIG. 8 take along line 9—9 in the direction of the arrows.

Referring now to FIG. 5, there is shown an amplifier circuit 10 having pre and post filtering utilizing ferrimagnetic input and output filters 11 and 12, respectively. Input filter 11 and post filter 12 have approximately the same center frequency and the post filter 12 serves to reject undesired sidebands produced by nonlinearities in the amplifier 10. Both the input and the output filters 11 and 12 are tuned for the same frequency and are swept in frequency by sweeping the polarizing magnetic field H produced by a common magnet structure 13, indicated by the dotted line in FIG. 5. The schematic line diagram for prefilter 11 and postfilter 12 is shown in FIG. 6. The filters 11 and 12 are each essentially the same as that of FIG. 3. Both filters are disposed in the common polarizing magnetic field H. Primed numbers have been employed in the drawing for identifying equivalent elements of the pre and postfilters.

Referring now to FIG. 7, there is shown a prior art superheterodyne receiver circuit 15 incorporating a ferrimagnetic input filter 11 with its corresponding magnet structure 16 and a ferrimagnetic oscillator at a second frequency $f_2$ displaced from the center passband frequency $f_1$ of the input filter 11 by the intermediate frequency. The local oscillator 17 has its own separate magnet structure 18. The output $f_1$ of the input filter 11 is amplified by amplifier 10 and thence fed to one input of a mixer 19 for mixing with the output $f_2$ of the local oscillator 17 to produce the sideband intermediate frequency ($f_1-f_2$). The intermediate frequency is then amplified in amplifier 21 to produce an amplified output signal. The receiver 15 is tuned through a desired operating range by sweeping the magnetic field of both magnets 16 and 18 via suitable sweep generators, not shown.

One of the problems with this prior art receiver circuit 15 is that the two magnets 16 and 18 can experience slightly different temperature environments and their sweep generators, which supply current to the magnets 16 and 18, can have slightly different dependencies on temperature such that it is extremely difficult to maintain the intermediate frequency within a very precise range. More particularly, if the input signal frequency to filter 11 is 10,000MHz and the intermediate frequency is 160MHz and is to be maintained within plus or minus 1MHz, this requires maintaining both magnetic fields in magnets 16 and 18 constant within plus or minus one part in $10^4$. As a consequence, the superheterodyne receiver of FIG. 7 requires a very high degree of regulation and control of the currents fed to the electromagnets 16 and 18 such that the overall receiver is extremely complex and costly.

FIGS. 8 and 9 show a portion of superheterodyne receiver 22 incorporating features of the present invention. The superheterodyne receiver 22 is similar to that of FIG. 7 with exception that the ferrimagnetic resonator bodies utilized for the input filter 11 and local oscillator 17 are disposed in the gap 23 between the opposed poles 24 and 25 of a common electromagnet 26.

The electromagnet 26 includes a hollow cylindrical magnetic permeable shell 27, as of soft iron, closed on opposite ends via disc-shaped end walls 28 and 29, as of soft iron, and having axially re-entrant pole pieces 24 and 25 which define a magnetic gap 23 therebetween. A pair of main energizing coils 31 and 32 are wound coaxially of the pole members 24 and 25, respectively.

One of the poles 24 is segmented into two portions 24' and 33 (see FIG. 9). An auxiliary coil 34 is wound around the auxiliary segment 33 for energizing the auxiliary pole 33 to produce an auxiliary magnetic field component ΔH in the gap 23 between pole 33 and the lower pole 25. Thus, the gap 23 of the magnet includes two regions, a first region having a magnetic field intensity H and a second region having a magnetic field intensity H plus ΔH, where ΔH is the auxiliary magnetic field component superimposed upon the main field H in the gap 23.

The ferrimagnetic resonator bodies 2 and 7 and 35 and 36 for the prefilter 11 and local oscillator 17, respectively, are disposed in the two different regions of the gap 23 such that the magnetic field H+ΔH within one of the pairs of ferrimagnetic resonator bodies, such as 35 and 36, is difference from that magnetic field intensity H within the other pair of ferrimagnetic resonator bodies 2 and 7. In this manner, the difference in magnetic fields ΔH and thus the offset in resonant frequency between the input filter 11 and local oscillator 17, namely ($f_1-f_2$), corresponds to the desired intermediate frequency ($f_1-f_2$) while both groups or pairs of ferrimagnetic resonator bodies are subject to similar changes in the intensity of the field H of the main magnet.

The advantage of this configuration of the magnet 26 is that field changes due to physical changes in dimensions due to temperature or other mechanical effects are transmitted to both regions of the magnetic field so that the difference frequency (the intermediate frequency) remains constant. The auxiliary field ΔH need only be maintained, regulated, or controlled to a much smaller percentage accuracy, i.e., plus or minus 1 part of 160 for the abovecited example, as contrasted to one part in $10^4$ for the prior art configuration using separate magnets.

A pair of sweep current generators 37 and 38 are employed for energizing the main coils 31 and 32 and the auxiliary coil 34, respectively. The first sweep generator 37 energizes the main magnet coils 31 and 32 with current to produce the main magnetic field component H. It also feeds a ramp of current to the energizing coils 31 and 32 for tuning or sweeping the resonant frequency of the filter and oscillator 17 in accordance with a predetermined scan of frequency. Thus sweep generator 37 provides a fixed magnetic field and, by means of the current ramp, electrically varies the intensity of said fixed magnetic field as applied to both sets of ferrimagnetic resonant bodies (2 and 7) and (35 and 36).

The second sweep generator 38 is synchronized with the first sweep generator 37. The output ramp of the second sweep generator 38, which energizes auxiliary coil 34, has a current v. time characteristic which slopes at a rate to compensate for slightly different tuning rates of the two groups of ferrimagnetic resonators associated with prefilter 11 and local oscillator 17, respectively. Thus sweep generator 38 electrically varies the magnetic field intensity applied to bodies 35 and 36 relative to that applied to bodies 2 and 7 so as to shift the resonant frequency of one resonant circuit (local oscillator 17) relative to that of the other (prefilter 11).

Figure 10:
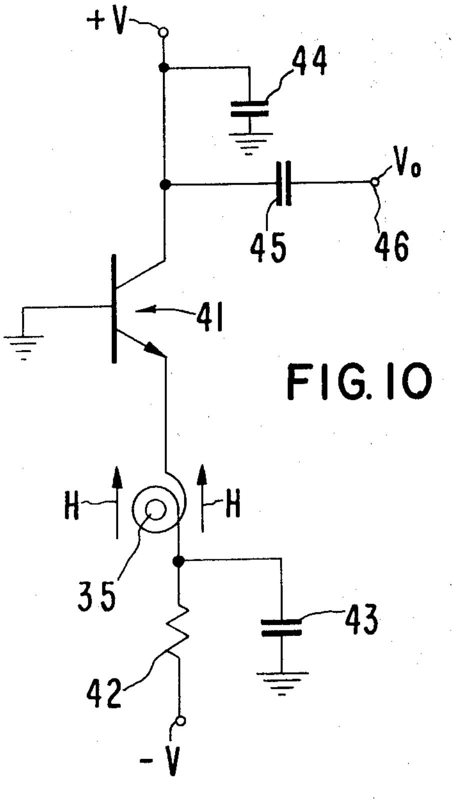
FIG. 10 is a schematic circuit diagram of a ferrimagnetic tuned oscillator.

Referring now to FIG. 10, there is shown a typical ferrimagnetic resonator tuned oscillator circuit 17. The oscillator circuit 17 includes a transistor 41 having a ferrimagnetic resonator body 35 magnetically coupled in series with the emitter lead to a source of negative potential −V via a biasing resistor 42. A bypass capacitor 43 bypasses resistor 42 to ground. The collector of the transistor 41 is connected to a source of positive voltage +V. The source of positive voltage is bypassed to ground via bypass capacitor 44. Output radio frequency energy is coupled from the collector via a coupling capacitor 45 to an output terminal 46. Varying the intensity of the polarizing field H applied to the ferrimagnetic resonator 35 tunes the output frequency of the oscillator $V_0$.

Figure 11:
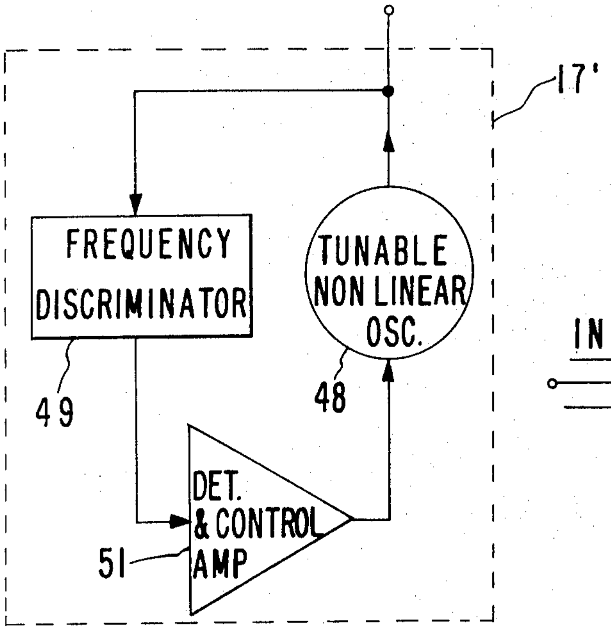
FIG. 11 is a schematic block diagram of a local oscillator incorporating features of the present invention.

Referring now to FIG. 11, there is shown an alternative local oscillator configuration 17'. Local oscillator 17' includes a tunable nonlinear oscillator 48, such as a varactor tuned transistor oscillator or a backward wave oscillator, for generating an output local oscillator radio frequency signal. A sample of the output of the tunable oscillator 48 is fed to the ferrimagnetic frequency discriminator 49, more fully disclosed in FIG. 12, to produce an output control voltage which has either a positive or negative value depending upon whether the output frequency of the tunable oscillator 48 is below or above the desired resonant frequency $f_2$ of the local oscillator 17'. The discriminator output characteristic is shown in FIG. 13.

The positive or negative output of the frequency discriminator 49 is fed to a detector and control amplifier 51 for producing a dc control voltage for application to the voltage tunable nonlinear oscillator 48 for tuning the frequency of the oscillator 48 to the desired center frequency $f_2$ of the frequency discriminator 49.

Figure 12:
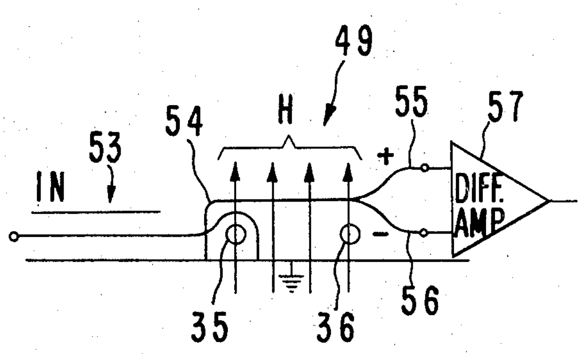
FIG. 12 is a schematic line diagram, partly in block diagram form, of a ferrimagnetic frequency discriminator.
Figure 13:
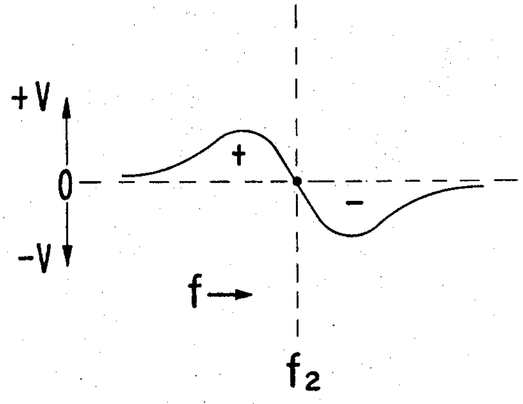
FIG. 13 is a plot of output voltage vs. frequency for the frequency discriminator of FIG. 12.

Referring now to FIG. 12, there is shown a schematic circuit for the ferrimagnetic frequency discriminator 49. The discriminator 49 includes an input coaxial line 53 which receives the output signal of the tunable oscillator 48. The center conductor of the input coaxial line 53 is inductively coupled to a first ferrimagnetic resonator body 35 disposed in the magnetic field H of a magnet similar to magnet 26 of FIG. 8. A second conductor 54 is magnetically coupled to the first ferrimagnetic resonator 35 and couples radio frequency energy from the first resonator 35 to a second ferrimagnetic resonator body 36.

Conductor 54 is split into a Y configuration at the second ferrimagnetic resonator body 36 to derive two radio frequency outputs one on each of legs 55 and 56. The output signals are detected and amplified by the difference amplifier 57. The resulting output has a characteristic as shown in FIG. 13. Thus, when the frequency of the radio frequency energy applied to the second ferrimagnetic resonator 36 is on one side of the resonant frequency $f_2$ of the ferrimagnetic resonator body 36, the magnitude of the radio frequency signal is relatively large on output terminal 55 and relatively small on output terminal 56, whereas when the frequency applied to the second ferrimagnetic resonator body 36 is on the other side of the resonant frequency $f_2$, the radio frequency output on terminal 56 is relatively large and the corresponding output on the other terminal 55 is relatively small.

The outputs from terminals 55 and 56 are fed to the two inputs of a differential amplifier 57 for producing an output dc signal of a sign and magnitude depending upon the departure of the applied signals from the frequency of the frequency discriminator $f_2$.

Although the magnetic circuit 26 has been described, thus far, as an electromagnet, this is not a requirement as the magnet 26 may also comprise a permanent magnet structure. Also the auxiliary magnet has been shown as an auxiliary electromagnet utilizing a portion of the pole of the main magnet. Various other configurations for the auxiliary magnet could be utilized. For example, the offset or auxiliary magnetic field could be produced by an auxiliary permanent magnet or one or both pole pieces 24 or 25 or both 24 and 25 could be shaped to provide two regions of different gap width. The shorter gap width would correspond to the region of higher magnetic field intensity. Also, the first and second ferrimagnetic resonator circuits need not be those of a filter and a local oscillator, respectively, but may comprise two filters, one having a frequency offset from the other, or two local oscillators, one having a frequency offset from the other.

What is claimed is:

1. In a tunable ferrimagnetic resonant circuit, main magnet means comprising a structure having a pair of spaced, opposing poles defining a gap and providing a fixed magnetic field in said gap, first and second ferrimagnetic resonator bodies disposed within said field in said gap, first and second electrical circuit means magnetically coupled to said first and second bodies, respectively, such that the resonant frequencies of said first and second circuit means are determined by said first and second resonator bodies, respectively, means for electrically varying the intensity of said fixed magnetic field applied to both of said bodies for shifting the resonant frequencies of both of said circuit means in the same direction simultaneously, and means for electrically varying the magnetic field intensity applied to one of said resonator bodies relative to the other for shifting the resonant frequency of one of said circuit means relative to the other.

2. The apparatus of claim 1 wherein said means for varying the magnetic field intensity applied to one of said resonator bodies comprises auxiliary electromagnet means for producing and superimposing an auxiliary magnetic field component on the main field in said gap.

3. The apparatus of claim 2 wherein one of said poles of said main magnet means includes a slot which divides said pole into first and second legs and said auxiliary electromagnetic means includes a coil wound around one of said legs.

4. The apparatus of claim 2 wherein said main magnet means comprises an electromagnet, and wherein said means for varying the magnetic field intensity includes first sweep generator means for energizing said main means with a current of varying amplitude.

5. The apparatus of claim 4 wherein said means for varying the magnetic field intensity includes an auxiliary electromagnet and second sweep current generator means for energizing said auxiliary electromagnet, whereby differences in tuning rates between said first and second ferrimagnetic resonator bodies can be compensated by employing different current sweep rates for said first and said second sweep current generator means.

6. The apparatus of claim 1 wherein said first electrical circuit is a bandpass filter circuit for band limiting a radio frequency input signal, and said second electrical circuit is part of a local oscillator circuit for generating a radio frequency local oscillator signal, and further including mixer means for heterodyning the output signal of said bandpass filter circuit with the output signal of said local oscillator for deriving an intermediate frequency signal.

7. The apparatus of claim 6 wherein said local oscillator circuit is tunable and further including tunable discriminator means connected to sample the output frequency of said tunable local oscillator circuit for deriving an output indicative of the sense and magnitude of the departure of the sampled frequency from the tuned frequency of the said discriminator means, and means responsive to the output of said discriminator means for tuning the frequency of said tunable local oscillator to the frequency of said discriminator means.

* * * * *